United States Patent [19]

Maeda et al.

[11] Patent Number: 4,957,797
[45] Date of Patent: Sep. 18, 1990

[54] ROOF LINING STRUCTURE FOR MOTOR VEHICLE

[75] Inventors: Takashi Maeda; Tsuyoshi Yamashita; Mitsuo Nakamura, all of Utsunomiya, Japan

[73] Assignee: Honda Giken Kogyo Kabushiki Kaisha, Tokyo, Japan

[21] Appl. No.: 349,114

[22] Filed: May 9, 1989

[30] Foreign Application Priority Data

May 9, 1988 [JP] Japan .................................. 63-112111
May 10, 1988 [JP] Japan .................................. 63-112778

[51] Int. Cl.$^5$ .............................................. B32B 7/00
[52] U.S. Cl. ....................................... 428/77; 296/211; 296/214; 428/76; 428/78; 428/115; 428/116; 428/192
[58] Field of Search ................... 428/76, 77, 78, 116, 428/115, 192; 296/211, 214

[56] References Cited

U.S. PATENT DOCUMENTS

| 4,002,367 | 1/1977 | Thomas | 296/211 |
| 4,091,160 | 5/1978 | Koss | 428/116 |
| 4,119,749 | 10/1978 | Roth et al. | 428/77 |
| 4,150,186 | 4/1979 | Kazama | 296/214 |
| 4,150,850 | 4/1979 | Doerfling | 428/160 |
| 4,330,584 | 5/1982 | Doerer | 428/91 |
| 4,352,522 | 10/1982 | Miller | 428/157 |
| 4,363,848 | 12/1982 | Le Duc et al. | 428/286 |
| 4,479,992 | 10/1984 | Häeseker et al. | 428/116 |
| 4,610,478 | 9/1986 | Tervol | 428/195 |
| 4,741,945 | 5/1988 | Brant et al. | 428/158 |

FOREIGN PATENT DOCUMENTS 053541  3/1983  Japan .................................. 296/214

*Primary Examiner*—Ellis P. Robinson
*Assistant Examiner*—Archene A. Turner
*Attorney, Agent, or Firm*—Irving M. Weiner; Joseph P. Carrier; Pamela S. Burt

[57] ABSTRACT

A roof lining structure in a motor vehicle includes a roof lining base member and a vibration-damping layer interposed between an upper surface of the base member and a lower surface of a roof panel of the motor vehicle. The roof lining base member comprises a support layer having a cellular structure, and a reinforcing layer disposed at least partly in the roof lining base member. The upper surface of the vibration-damping layer is held in intimate contact with the lower surface of the roof panel. The vibration-damping layer is bonded to the roof panel by an adhesive layer. The vibration-damping layer is made of a material having such a mechanical strength that the vibration-damping layer will be torn apart vertically with a tearing force weaker than the bonding strength of the adhesive layer.

12 Claims, 2 Drawing Sheets

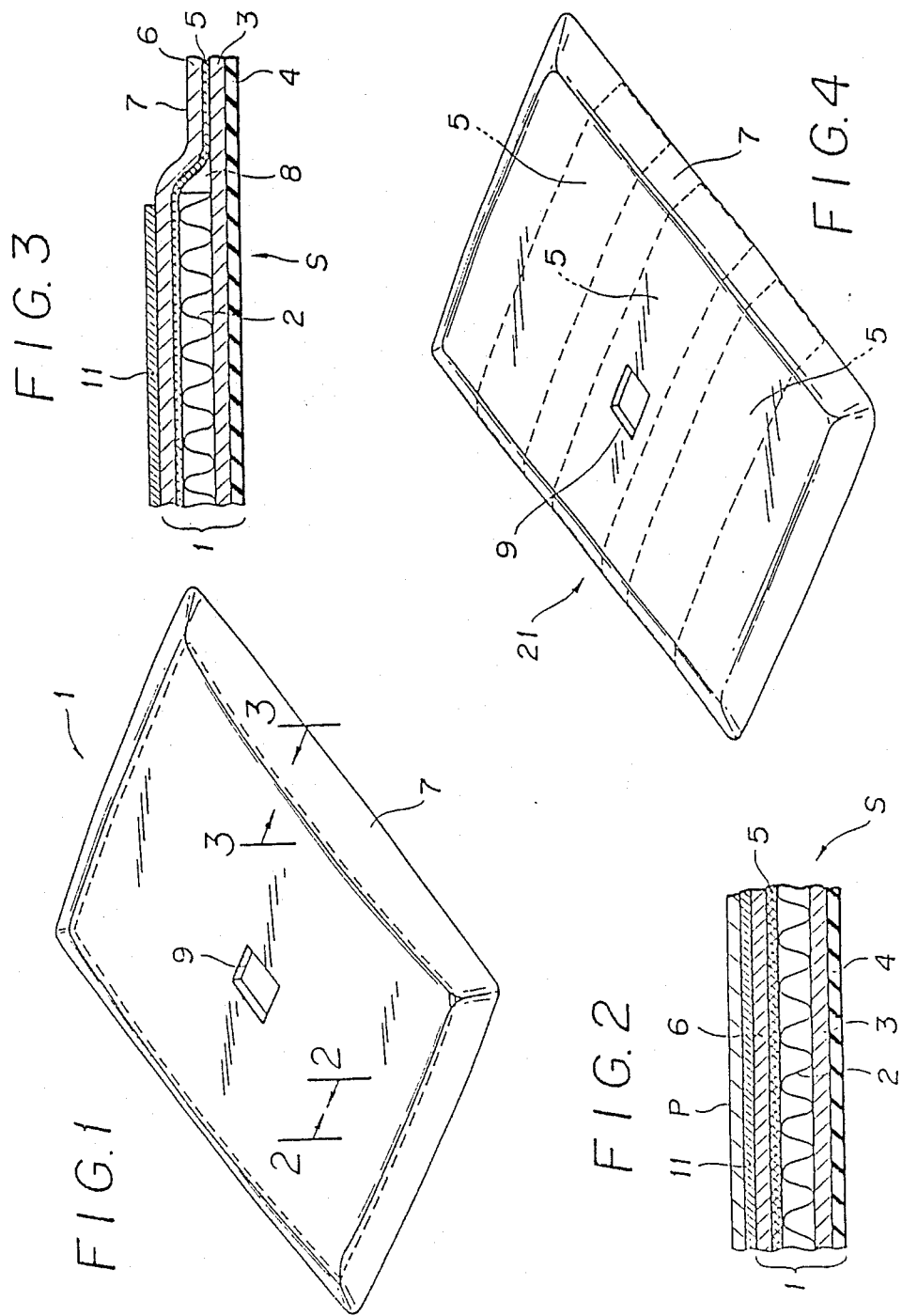

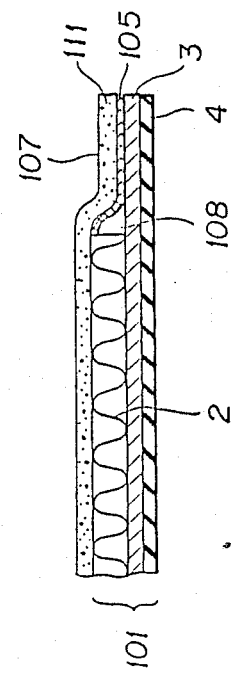
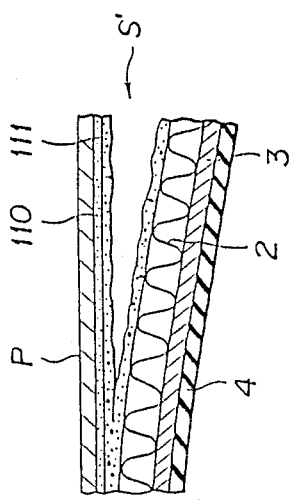
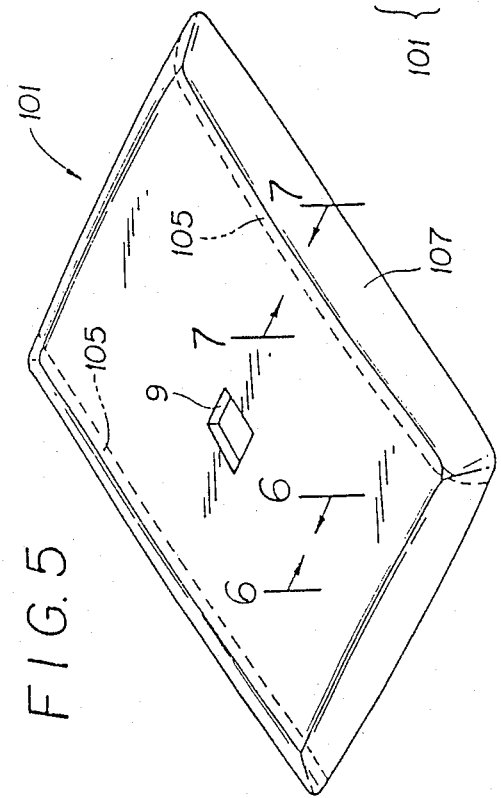
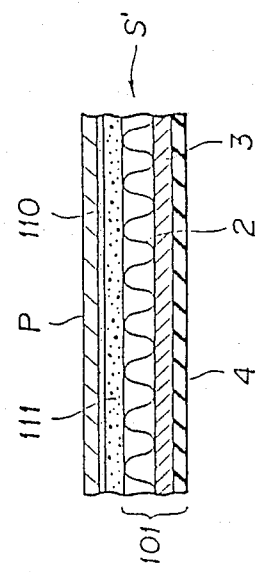

ROOF LINING STRUCTURE FOR MOTOR VEHICLE

BACKGROUND OF THE INVENTION

1. Field of the Invention

The present invention relates to a roof for a motor vehicle, and more particularly to a roof lining structure for a motor vehicle.

2. Description of the Relevant Art

Heretofore, motor vehicle roofs include relatively heavy roof arches of metal used as frame members of roof panels.

Japanese Laid-Open Patent Publication No. 56-80450 published on July 1, 1981 discloses a roof lining having a laminated structure free from roof arches to reduce the weight of an automobile roof. The disclosed roof lining comprises a support layer as a core, an air-permeable layer and a decorative layer which are disposed on one side of the support layer which faces a passenger compartment, and a covering layer on the other side of the support layer which faces a roof panel. The decorative layer comprises a resin sheet or the like which is permeable to air. The support layer is made of cardboard having a cellular structure such as a honeycomb structure. The covering layer is made of resin fibers having air permeability. The support layer provides a desired degree of rigidity for the roof, whereas the decorative and covering layers have a sound absorption capability. The roof lining structure is free of roof arches, makes the overall roof lightweight, and achieves good sound absorption.

The covering layer made of resin fibers is bonded to the side of the roof panel which faces the passenger compartment. Therefore, the roof lining does not make the roof panel sufficiently resistant to vibrations, and fails to render the entire roof sufficiently rigid.

In view of the aforesaid problems of the conventional roof lining structure for motor vehicles, it is an object of the present invention to provide a roof lining structure which is free of the conventional drawbacks.

SUMMARY OF THE INVENTION

It is an object of the present invention to provide a roof lining structure for a motor vehicle, which is free of roof arches thus making a roof lightweight in its entirety, has an increased sound absorption capability, makes a roof panel sufficiently resistant to vibrations, and increases the rigidity of the entire roof.

To achieve the above object, there is provided in accordance with the present invention a roof lining structure in a motor vehicle having a roof panel, comprising: a roof lining base member; and a vibration-damping layer interposed between an upper surface of said base member and a lower surface of the roof panel, the roof lining base member comprises: a support layer having a cellular structure; a first covering layer disposed on a surface of said support layer which faces a passenger compartment of the motor vehicle; a decorative layer disposed on a surface of said first covering layer which faces the passenger compartment; and a reinforcing layer disposed at least partly in said roof lining base member.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a perspective view of a base member which is a basic component of a roof lining structure for a motor vehicle according to a first embodiment of the present invention;

FIG. 2 is a cross-sectional view taken along line II—II of FIG. 1;

FIG. 3 is a cross-sectional view taken along line III—III of FIG. 1;

FIG. 4 is a perspective view of a modified base member;

FIG. 5 is a perspective view of a base member which is a basic component of a roof lining structure for a motor vehicle according to a second embodiment of the present invention;

FIG. 6 is a cross-sectional view taken along line VI—VI of FIG. 5;

FIG. 7 is a cross-sectional view taken along line VII—VII of FIG. 5; and

FIG. 8 is a fragmentary cross-sectional view of the base member shown in FIG. 5, with a vibration-damping layer torn apart.

DETAILED DESCRIPTION OF THE PREFERRED EMBODIMENTS

FIGS. 1 and 2 show a roof lining structure, generally designated by the reference numeral S, for a motor vehicle according to a first embodiment of the present invention. The roof lining structure S includes a base member 1 of a rectangular shape as viewed in plan, the base member 1 having a central hole 9 defined therein for attachment of a dome light. The base member 1 includes a support layer 2 as a core, a covering layer 3 and a decorative layer 4 which are successively placed on a surface of the support layer 2 which faces a passenger compartment of a motor vehicle, and a reinforcing layer 5 and a covering layer 6 which are successively placed on the opposite surface of the support layer 2 which faces a roof panel P. Therefore, the base member 1 is of a laminated structure comprising five layers 4, 3, 2, 5, 6. On the upper surface of the base member 1 which faces the roof panel P, there is disposed a vibration-damping layer 11 for dampening vibrations tending to bend the roof panel P.

The support layer 2 is in the form of a honeycomb core having a cellular or particularly honeycomb structure constructed of a highly rigid material such as relatively thick cardboard paper, phenol-impregnated paper, or the like. The honeycomb structure of the support layer 2 is cellular in the plane of the support layer 2, and hence has mechanical strength in the transverse direction of the support layer 2. The support layer 2 is substantially rectangular in shape as viewed in plan, and is substantially coextensive with the base member 1.

The covering layer 3 is made of an air-permeable material such as resin fibers, glass wool, cloth, phenolimpregnated cloth, or the like. The resin fibers may for example be resin felt or the like. The covering layer 3 is of a substantially rectangular configuration larger than the support layer 2, and covers the support layer 2 so as to fully underlie the entire lower surface of the support layer 2 which faces the passenger compartment.

The decorative layer 4 is made of an air-permeable material such as tricot or warp-knitted fabric, nonwoven fabric, porous resin sheet, or the like. The decorative layer 4 is of a shape substantially identical to that of the covering layer 3, and underlies the entire lower surface of the covering layer 3 which faces the passenger compartment.

The reinforcing layer 5 is made of a highly rigid air-permeable material such as resin felt, glass wool, FRP (polyester, urethane, etc.), or the like. The reinforcing layer 5 is of a substantially rectangular shape larger than the support layer 2, and covers the support layer 2 so as to fully overlie the upper surface of the support layer 2 which faces the roof panel P.

The covering layer 6 is made of the same material as the material that the covering layer 3 is made of, and is of substantially the same shape as that of the covering layer 3.

While the covering layers 3, 6 are shown as being disposed beneath and above the support layer 2 in the illustrated embodiment, one of the covering layers 3, 6 may be dispensed with.

The lining base member 1 is formed integrally by compressing the support layer 2, the reinforcing layer 5, the upper and lower covering layers 6, 3, and the decorative layer 4 with a press. However, these layers 2, 5, 3, 6, 4 may be bonded together by an adhesive.

As shown in FIG. 3, the base member 1 has closed peripheral edges 7 in which the reinforcing layer 5 and the covering layer 3 are directly joined to each other without the support layer 2 interposed therebetween. Inside of each peripheral edge 7, there is defined a small space 8 by an outer edge of the support layer 2, a lower surface of the reinforcing layer 5, and an upper surface of the covering layer 3, the space 8 extending along the peripheral edge 7. Though the support layer 2 is not contained in each peripheral edge 7, the rigidity of the peripheral edge 7 is sufficiently increased by the reinforcing layer 5. The rigidity of the edge of the dome lamp attachment hole 9 is also increased by the reinforcing layer 5 regardless of the lack of the support layer 2 in that edge.

The four layers 4, 3, 5, 6 have substantially the same rectangular shapes as viewed in plan.

The vibration-damping layer 11 is placed on the area of the upper surface of the lining base member 1 except the peripheral edges 7. In other words the layer 11 has substantially the same configuration as that of the support layer 2 as viewed in plan. The lining base member 1 cooperates with the vibration-damping layer 11 in forming an upper surface held against the lower surface of the roof panel P. The vibration-damping layer 11 is made of an air-permeable, highly vibration-damping material such as asphalt-impregnated urethane foam or the like. The vibration-damping layer 11 may be formed integrally with the layers 4, 3, 2, 5, 6 when the lining base member 1 is pressed to shape, or may be independently formed into a shape corresponding to that of the base member 1 and then bonded to the upper surface of the base member 1.

The lining base member 1 is attached to the panel P by an adhesive, fasteners, or the like so that the upper surface of the vibration-damping layer 11 and the lower surface of the roof panel P are held intimately against each other. If fasteners such as bolts are used to attach the base member 1 to the roof panel P, then the peripheral edges 7 including the reinforcing layer 5 are attached to portions of a motor vehicle body such as roof rails (not shown). The base member 1 and the vibration-damping material 11 jointly make up the roof lining structure S, and the roof lining structure S and the roof panel P jointly constitute a motor vehicle roof. With the roof lining structure S joined to the roof panel P, the rigidity of the base member 1 itself is maintained by the honeycomb-core support layer 2. The air-permeable decorative and covering layers 4, 3, 6 serve as sound-absorbing layers for absorbing or attenuating sounds in the passenger compartment. The vibration-damping layer 11 sandwiched between the lining base member 1 and the roof panel P provides a higher ability to dampen vibrations directed toward the roof panel P and makes the rigidity of the roof itself higher than the conventional roof lining structure. The rigidity of the roof itself is further increased by the reinforcing layer 5 extending fully in the base member 1.

In the roof lining structure S of the present invention, the vibration-damping layer 11 is interposed between the roof panel P and the base member 1 having the laminated structure comprising the layers 4, 3, 2, 5, 6. Therefore, the ability of the roof lining structure S to dampen vibrations directed toward the roof panel P and the rigidity of the roof itself are increased. The sound-absorbing capability of the roof lining structure S is achieved by the decorative layer 4 and the covering layers 3, 6 which serve as sound-absorbing layers. The roof lining structure S makes the roof itself lightweight since no roof arch is employed. The reinforcing layer 5 extending fully in the base member 1 makes the rigidity of the base member 1 and hence the rigidity of the roof itself higher than the corresponding rigidities in the conventional roof lining structure.

FIG. 4 shows a modified base member 21 according to the present invention. The base member 21 includes a plurality of (three in FIG. 4) strip-shaped reinforcing layers 5 each extending transversely across the base member 21 and having a length equal to the full width of the base member 21, the reinforcing layers 5 being spaced at equal distances in the longitudinal direction of the base member 21. The reinforcing layers 5 are also effective in increasing the rigidity of the base member 21. If fasteners such as bolts are used to attach the base member 21 to the roof panel P, then the peripheral edges 7 including the reinforcing layers 5 are attached to portions of a motor vehicle body such as roof rails (not shown).

FIGS. 5 through 8 show a roof lining structure S' for a motor vehicle according to a second embodiment of the present invention. Those parts in FIGS. 5 through 8 which are identical to those of the roof lining structure S shown in FIGS. 1 through 3 are denoted by identical reference numerals, and will not be described in detail.

The roof lining structure S' comprises a lining base member 101 and a vibration-damping layer 111 interposed between the base member 101 and a roof panel P. The lining base member 101 and the vibration-damping layer 111 form an upper surface held against the lower surface of the roof panel P. The lining base member 101 has a substantially rectangular shape having a central hole 9 for attaching a dome light. The lining base member 101 is of a three-layer construction having a decorative layer 4, a covering layer 3, and a support layer 2 successively arranged in the order mentioned from the lower surface of the lining base member 101. A reinforcing layer 105 which extends in the longitudinal direction of the base member 101 is interposed between the vibration-damping layer 111 and the covering layer 3 in each of lateral peripheral edges 107 of the base member 101. Inside of each of the peripheral edges 107, there is defined a small space by an outer end of the support layer 2, a lower surface of the reinforcing layer 105, and an upper surface of the covering layer 3, the space extending in the longitudinal direction of the base member 101. Though the support layer 2 is not contained in each peripheral edge 107, the rigidity of the peripheral edge 7 is sufficiently increased by the reinforcing layer 105. The rigidity of the edge of the dome lamp attachment hole 9 is also increased by the reinforcing layer 105 regardless of the lack of the support layer 2 in that edge.

The three layers 4, 3, 111 have substantially the same rectangular shapes as viewed in plan.

The vibration-damping layer 111 is made of a vibration-damping foam material which is permeable to air, has a high vibration-damping ability, but can easily be torn apart, such as asphalt-impregnated urethane foam. The vibration-damping layer 111 extends all over the upper surface of the lining base member 101 including the lateral peripheral edges 107. The base member 101 is integrally formed by pressing or bonding the layers 4, 3, 2 with an adhesive. The vibration-damping layer 111 is similarly attached to the upper surface of the support layer 2.

An adhesive layer 110 is disposed on the upper surface of the vibration-damping layer 111 in coextensive relation to the entire upper surface thereof. Therefore, the upper surface of the vibration-damping layer 111 is bonded to the lower surface of the roof panel P by the adhesive layer 110. The adhesive layer 110 may be provided by coating the entire upper surface of the vibration-damping layer 111 with an acrylic or epoxy adhesive. The adhesive layer 110 may however be replaced with an adhesive tape for attaching the vibration-damping layer 111 to the roof panel P. The peripheral edges 107 of the base member 101, which include the reinforcing layer 105, may additionally be secured to portions of a motor vehicle body such as roof rails (not shown) by means of fasteners such as bolts.

With the base member 101 and the vibration-damping layer 111 being attached to the roof panel P by the adhesive layer 110, the rigidity of the base member 101 itself is maintained by the support layer 2 which comprises a honeycomb core. The air-permeable decorative and covering layers 4, 3 double as sound-absorbing layers for absorbing or attenuating sounds in the passenger compartment. The vibration-damping layer 111 sandwiched between the lining base member 101 and the roof panel P provides a higher ability to dampen vibrations directed toward the roof panel P and makes the rigidity of the roof itself higher than the conventional roof lining structure. The roof lining structure S' makes the roof lightweight in its entirety as it has no roof arch. The rigidity of the base member 101 and hence the roof itself is further increased by the reinforcing layer 105 disposed partly in the base member 101. The roof lining structure S' shown in FIGS. 5 through 8 offers the same advantages as those of the roof lining structures S shown in FIGS. 1 through 4.

It is important to note that the vibration-damping layer 111 is of such a mechanical strength that it can be torn apart vertically with a tearing force which is weaker than the bonding strength of the adhesive layer 110. Therefore, after the base member 101 and the vibration-damping layer 111 are attached to the roof panel P by the adhesive layer 110, the vibration-damping layer 111 can be torn apart into two separate layers as shown in FIG. 8 by pulling down a portion of one of the peripheral edges 107 of the base member 101. When the vibration-damping layer 111 is thus torn apart, a substantial portion of the base member 101 is peeled off the roof panel P. The base member, 101 may thus be peeled off the roof panel P when it is necessary to repair the roof panel P to remove any deformation therefrom, for example. After the roof panel P is repaired, an adhesive is applied to the torn-apart surface of at least one of the two separated layers of the vibration-damping layer 111, and these two layers are bonded together to complete the vibration-damping layer 111 as a single unitary layer, whereupon the roof lining structure S' is restored.

According to the roof lining structure S' shown in FIGS. 5 through 8, since the vibration-damping layer 111 is vertically rupturable with a tearing force that is weaker than the bonding strength of the adhesive layer 110, a substantial portion of the roof lining base member 101 can easily be separated from the roof panel P. Therefore, the roof panel P can easily be repaired to flatten a deformed surface or the like, for example. The roof panel P can therefore be well serviced. According to some conventional roof lining structures, the lining base member is bonded to the entire lower surface of the roof panel, and the adhesive layer and covering layer of the lining base member are of materials which cannot easily be torn apart. These prior roof lining structures therefore make it difficult to repair or otherwise service the roof panel.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A roof lining structure in a motor vehicle having a roof panel, comprising:
   a roof lining base member; and
   a vibration-damping layer interposed between an upper surface of said base member and a lower surface of the roof panel, said roof lining base member comprising:
   a support layer having a cellular structure;
   a first covering layer disposed on a surface of said support layer which faces a passenger compartment of the motor vehicle;
   a decorative layer disposed on a surface of said first covering layer which faces the passenger compartment; and
   a reinforcing layer disposed at least partly in said roof lining base member.

2. A roof lining structure according to claim 1, wherein said vibration-damping layer has an upper surface held in intimate contact with the lower surface of the roof panel.

3. A roof lining structure according to claim 1, further comprising an adhesive layer interposed between said vibration-damping layer and the roof panel and bonding the vibration-damping layer to the roof panel, said vibration-damping layer being made of a material having such a mechanical strength that the vibration-damping layer will be torn apart vertically with a tearing force weaker than the bonding strength of said adhesive layer so that said roof lining base member can be substantially separated from the roof panel by vertically tearing apart said vibration-damping layer.

4. A roof lining structure according to claim 1, wherein said reinforcing layer substantially entirely covers a said roof lining base member.

5. A roof lining structure according to claim 4, wherein said reinforcing layer is disposed on a surface of said support layer which faces the roof panel.

6. A roof lining structure according to claim 5, wherein said roof lining base member further comprises a second covering layer interposed between said reinforcing layer and said vibration-damping layer.

7. A roof lining structure according to claim 1, wherein said reinforcing layer comprises a plurality of strip-shaped layers extending transversely across said roof lining base member and each having a length extending the full width of the roof lining base member.

8. A roof lining structure in a motor vehicle having a roof panel, comprising:
- a vibration-damping layer joined to a predetermined area of a lower surface of the roof panel;
- a support layer joined to a lower surface of said vibration-damping layer and covering substantially the entire lower surface of the vibration-damping layer, said support layer having a cellular structure extending in the plane of said support layer to have a mechanical strength in the transverse direction of the support layer;
- a covering layer joined to a lower surface of said support layer and covering substantially the entire lower surface of the covering layer; and
- a decorative layer joined to a lower surface of said covering layer and covering substantially the entire lower surface of the covering layer;
said vibration-damping layer is made of a rupturable material.

9. A roof lining structure according to claim 8, further comprising a reinforcing layer interposed at least partly between said support layer and said vibration-damping layer.

10. A roof lining structure according to claim 1, wherein said reinforcing layer is adapted to enhance the rigidity of the roof lining structure.

11. A roof lining structure according to claim 9, wherein said reinforcing layer is adapted to enhance the rigidity of the roof lining structure.

12. A roof lining structure according to claim 8, further comprising an adhesive layer interposed between said vibration-damping layer and the roof panel and bonding the vibration-damping layer to the roof panel, said vibration-damping layer being made of a material having such a mechanical strength that the vibration-damping layer will be torn apart vertically with a tearing force weaker than the bonding strength of said adhesive layer so that the support layer can be substantially separated from the roof panel by vertically tearing apart said vibration-damping layer.

* * * * *

UNITED STATES PATENT AND TRADEMARK OFFICE
CERTIFICATE OF CORRECTION

PATENT NO. : 4,957,797

DATED : September 18, 1990

INVENTOR(S) : Maeda et al.

It is certified that error appears in the above-identified patent and that said Letters Patent is hereby corrected as shown below:

Column 2, line 59, change "pheno" to --phenol--;
         line 60, change "limpregnated" to --impregnated--.

Column 6, line 3, change "member, 101" to --member 101--.

Column 7, line 3 (Claim 4, line 3), delete "a".

Signed and Sealed this

Twenty-sixth Day of November, 1991

Attest:

HARRY F. MANBECK, JR.

*Attesting Officer*    *Commissioner of Patents and Trademarks*